United States Patent
Yang et al.

(10) Patent No.: US 10,506,621 B2
(45) Date of Patent: Dec. 10, 2019

(54) UPLINK SHARING IN A MULTIPLE RADIO ACCESS TECHNOLOGY ENVIRONMENT

(71) Applicant: QUALCOMM Incorporated, San Diego, CA (US)

(72) Inventors: Ming Yang, San Diego, CA (US); Kausik Ray Chaudhuri, San Diego, CA (US); Sameh Guirguis, San Diego, CA (US); Ozge Koymen, Princeton, NJ (US); Atanu Halder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 15/827,883

(22) Filed: Nov. 30, 2017

(65) Prior Publication Data
US 2019/0166605 A1    May 30, 2019

(51) Int. Cl.
| | | |
|---|---|---|
| *H04W 72/12* | (2009.01) | |
| *H04W 16/14* | (2009.01) | |
| *H04L 5/00* | (2006.01) | |
| *H04W 72/04* | (2009.01) | |
| *H04L 1/18* | (2006.01) | |
| *H04W 74/00* | (2009.01) | |

(52) U.S. Cl.
CPC ....... *H04W 72/1215* (2013.01); *H04L 1/1829* (2013.01); *H04L 5/0055* (2013.01); *H04W 16/14* (2013.01); *H04W 72/0413* (2013.01); *H04L 1/1867* (2013.01); *H04W 72/1268* (2013.01); *H04W 74/004* (2013.01)

(58) Field of Classification Search
None
See application file for complete search history.

(56) References Cited

U.S. PATENT DOCUMENTS

| | | | | |
|---|---|---|---|---|
| 8,861,461 | B2* | 10/2014 | Marinier | H04B 7/0626 370/329 |
| 9,979,525 | B2* | 5/2018 | Tang | H04L 1/1861 |
| 2004/0109433 | A1* | 6/2004 | Khan | H04L 1/1614 370/345 |
| 2009/0028091 | A1 | 1/2009 | Dimou et al. | |
| 2009/0201869 | A1* | 8/2009 | Xu | H04L 1/1671 370/329 |
| 2010/0208679 | A1* | 8/2010 | Papasakellariou | H04L 1/1614 370/329 |
| 2010/0210256 | A1* | 8/2010 | Shen | H04L 1/1614 455/422.1 |
| 2010/0232311 | A1* | 9/2010 | Zhang | H04L 5/0007 370/252 |

(Continued)

OTHER PUBLICATIONS

International Search Report and Written Opinion—PCT/US2018/063061—ISA/EPO—dated Feb. 21, 2019.

(Continued)

*Primary Examiner* — Phirin Sam
*Assistant Examiner* — Tarell A Hampton
(74) *Attorney, Agent, or Firm* — Patterson & Sheridan, LLP

(57) ABSTRACT

Certain aspects of the present disclosure provide techniques for sharing uplinks in a multiple radio access technology environment. Such techniques may improve transmission and processing of acknowledgment data from a user equipment in the multiple radio access technology environment.

30 Claims, 11 Drawing Sheets

(56) References Cited

U.S. PATENT DOCUMENTS

| | | | |
|---|---|---|---|
| 2012/0020299 A1* | 1/2012 | Chun | H04L 1/1607 370/328 |
| 2012/0093073 A1* | 4/2012 | Lunttila | H04L 1/1607 370/328 |
| 2012/0230268 A1 | 9/2012 | Marinier et al. | |
| 2013/0088983 A1* | 4/2013 | Pragada | H04W 16/14 370/252 |
| 2013/0329583 A1* | 12/2013 | Vrzic | H04W 36/30 370/252 |
| 2013/0329694 A1* | 12/2013 | Vrzic | H04W 36/165 370/331 |
| 2014/0314048 A1* | 10/2014 | Yi | H04W 36/0072 370/332 |
| 2014/0369242 A1* | 12/2014 | Ng | H04W 72/0453 370/280 |
| 2015/0208366 A1* | 7/2015 | Papasakellariou | H04W 74/0833 370/311 |
| 2016/0269943 A1* | 9/2016 | Ji | H04W 36/0022 |
| 2017/0078914 A1* | 3/2017 | Fujishiro | H04W 28/04 |
| 2017/0208568 A1* | 7/2017 | Nam | H04W 72/042 |
| 2017/0223695 A1* | 8/2017 | Kwak | H04W 56/0075 |
| 2018/0367230 A1* | 12/2018 | Su | H04J 1/08 |
| 2018/0368199 A1* | 12/2018 | Zeng | H04B 7/2643 |
| 2019/0075604 A1* | 3/2019 | Wang | H04W 76/15 |

OTHER PUBLICATIONS

Samsung: "Soft Buffer Partitioning", 3GPP Draft; R1-1710731 Soft Buffer, 3rd Generation Partnership Project (3GPP), Mobile Competence Centre, 650, Route Des Lucioles ; F-06921 Sophia-Antipolis Cedex, France, vol. RAN WG1, No. Qingdao, China; Jun. 27, 2017-Jun. 30, 2017, Jun. 26, 2017 (Jun. 26, 2017), XP051299936, pp. 1-2, Retrieved from the Internet: URL: http://www.3gpp.org/ftp/Meetings_3GPP_SYNC/RAN1/Docs/ [retrieved on Jun. 26, 2017].

Vivo: "Issues on UL Transmission for LTE-NR Co-existence", 3GPP Draft; R1-1710385 Issues on UL Transmission for LTE-NR Co-existence, 3rd Generation Partnership Project (3GPP), Mobile Competence Centre, 650, Route Des Lucioles ; F-06921 Sophia-Antipolis Cedex, France, vol. RAN WG1, No. Qingdao, China; Jun. 27, 2017-Jun. 30, 2017, Jun. 26, 2017 (Jun. 26, 2017), XP051299598, pp. 1-5, Retrieved from the Internet: URL: http://www.3gpp.org/ftp/Meetings_3GPP_SYNC/RAN1/Docs/ [retrieved on Jun. 26, 2017].

* cited by examiner

UPLINK SHARING IN A MULTIPLE RADIO ACCESS TECHNOLOGY ENVIRONMENT

INTRODUCTION

Aspects of the present disclosure relate to wireless communications, and more particularly, to techniques for sharing uplinks in a multiple radio access technology environment. Such techniques may improve transmission and processing of acknowledgment data from a user equipment in the multiple radio access technology environment.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations, each simultaneously supporting communication for multiple communication devices, otherwise known as user equipments (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL), as well as supporting beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between participants in a wireless network.

Certain aspects provide a method for wireless communication, and in particular, a method for providing acknowledgment data from a user equipment in a multiple radio access technology environment, including: receiving, at the user equipment from a first base station, a first data transmission on a first physical downlink shared channel in accordance with a first radio access technology; and transmitting, from the user equipment to a second base station, at least one of: an acknowledgment (ACK) on a physical uplink control channel in accordance with a second radio access technology after determining, by the user equipment, that the first data transmission has been received correctly; or a negative acknowledgment (NACK) on the physical uplink control channel in accordance with the second radio access technology, after determining, by the user equipment, that the first data transmission has not been received correctly. Another aspect provides a user equipment for wireless communication in a multiple radio access technology environment configured to perform the method for providing acknowledgment data from a user equipment in a multiple radio access technology environment.

Other aspects provide a method for processing acknowledgment data from a user equipment in a multiple radio access technology environment, including: transmitting, from a first base station to the user equipment, a first data transmission on a first physical downlink shared channel in accordance with a first radio access technology; receiving, at a second base station from the user equipment, at least one of: an acknowledgment (ACK) of the first data transmission on a physical uplink control channel in accordance with a second radio access technology; or a negative acknowledgment (NACK) of the first data transmission on the physical uplink control channel in accordance with the second radio access technology; and transmitting, from the second base station to the first base station, the at least one of the ACK or the NACK. Another aspect provides a system for processing acknowledgment data from a user equipment in a multiple radio access technology environment configured to perform the method for processing acknowledgment data from a user equipment in a multiple radio access technology environment.

To the accomplishment of the foregoing and related ends, the one or more aspects comprise the features hereinafter fully described and particularly pointed out in the claims. The following description and the related drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
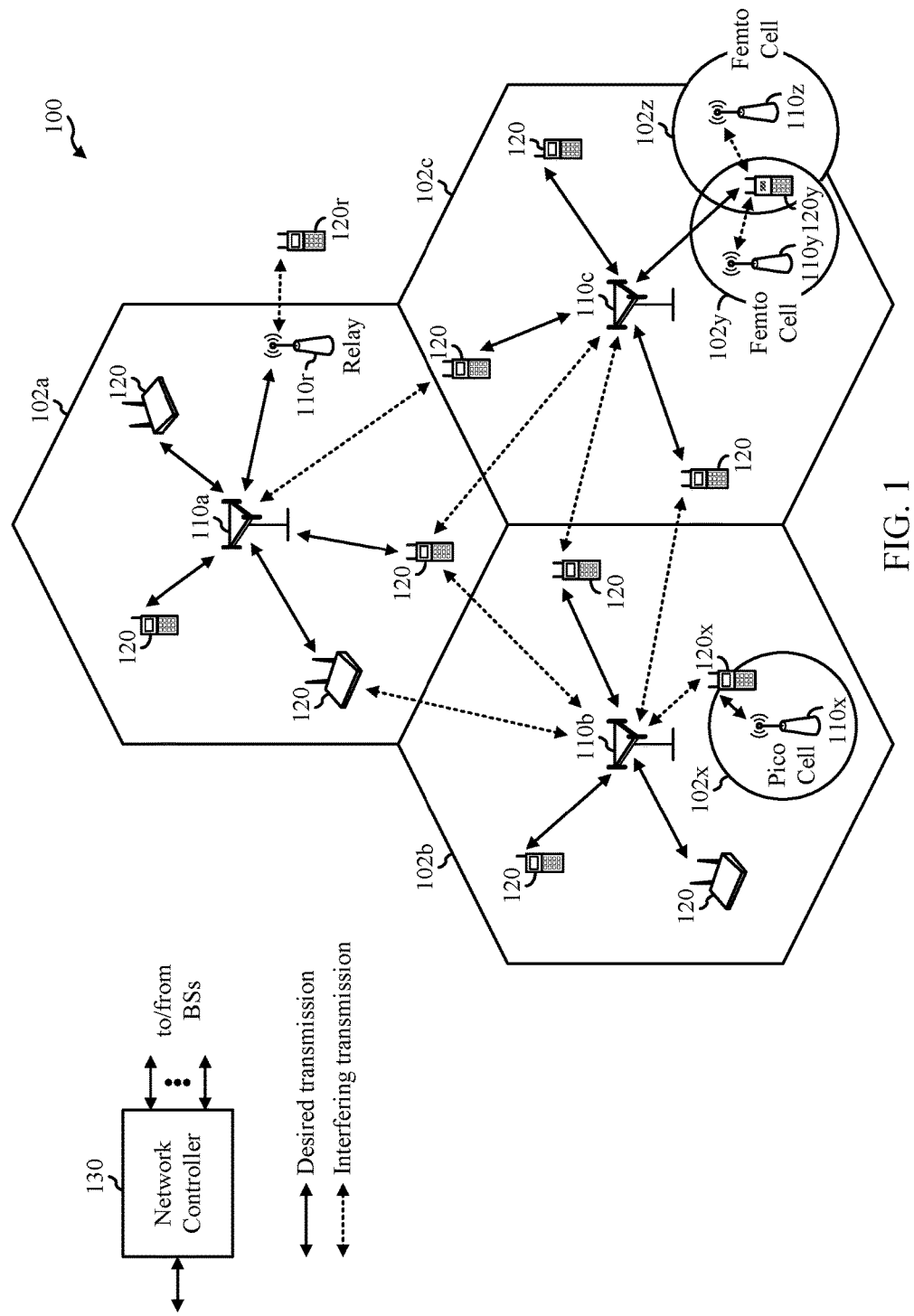
FIG. 1 is a block diagram conceptually illustrating an example telecommunications system, in accordance with certain aspects of the present disclosure.

Aspects of the present disclosure provide apparatus, methods, processing systems, and computer readable mediums for sharing uplinks in a multiple radio access technology environment, which may improve transmission and processing of acknowledgment data from a user equipment in the multiple radio access technology environment.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New Radio (NR) may support various wireless communication services, such as: Enhanced Mobile Broadband (eMBB) targeting wide bandwidth (e.g. 80 MHz and beyond), millimeter wave (mmW) targeting high carrier frequency (e.g. 27 GHz and beyond), massive machine-type communication (mMTC) targeting non-backward compatible machine-type communication (MTC) techniques, and/or mission critical services targeting ultra-reliable low latency communications (URLLC). These services may include latency and reliability requirements. These services may also have different transmission time intervals (TTIs) to meet respective quality of service (QoS) requirements. In addition, these services may coexist in the same subframe. In LTE, the basic transmission time interval (TTI) or packet duration is 1 subframe of 1 ms, and a subframe may be further divided into two slots of 0.5 ms each. In NR, a subframe may still be 1 ms, but the basic TTI may be referred to as a slot. Further, in NR, a subframe may contain a variable number of slots (e.g., 1, 2, 4, 8, 16, . . . slots) depending on the tone spacing (e.g., 15, 30, 60, 120, 240, . . . kHz).

Example Wireless Communications System

FIG. 1 illustrates an example wireless communication network 100 in which aspects of the present disclosure may be performed. For example, the wireless network may be a New Radio (NR) or 5G network.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in the wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

The wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into sub-bands. For example, a sub-band may cover 1.08 MHz (i.e., 6 resource blocks), and there may be 1, 2, 4, 8, or 16 sub-bands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a cyclic prefix (CP) on the uplink and downlink and include support for half-duplex operation using time division duplexing (TDD). A single component carrier (CC) bandwidth of 100 MHz may be supported. NR resource blocks may span 12 subcarriers with a subcarrier bandwidth of 75 kHz over a 0.1 ms duration. Each radio frame of 10 ms may consist of 2 half-frames of 5 ms, and each half-frame may consist of 5 subframes of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units (CUs) and/or distributed units (DUs).

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs). In such examples, other UEs may utilize resources scheduled by the UE for wireless communication. In some examples, a UE may function as a scheduling entity in a peer-to-peer (P2P) network, and/or in a mesh network. In a mesh network example, UEs may optionally communicate directly with one another in addition to communicating with a scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a Radio Access Network (RAN) may include a Central Unit (CU) and Distributed Units (DUs). A NR BS (e.g., gNB, 5G Node B, Node B, transmission reception point (TRP), access point (AP)) may correspond to one or multiple BSs. NR cells can be configured as access cell (ACells) or as data only cells (DCells). For example, the RAN (e.g., a CU or DU) can configure the cells. DCells may be cells used for carrier aggregation or dual connectivity, but not used for initial access, cell selection/reselection, or handover. In some cases DCells may not transmit synchronization signals (SS)—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
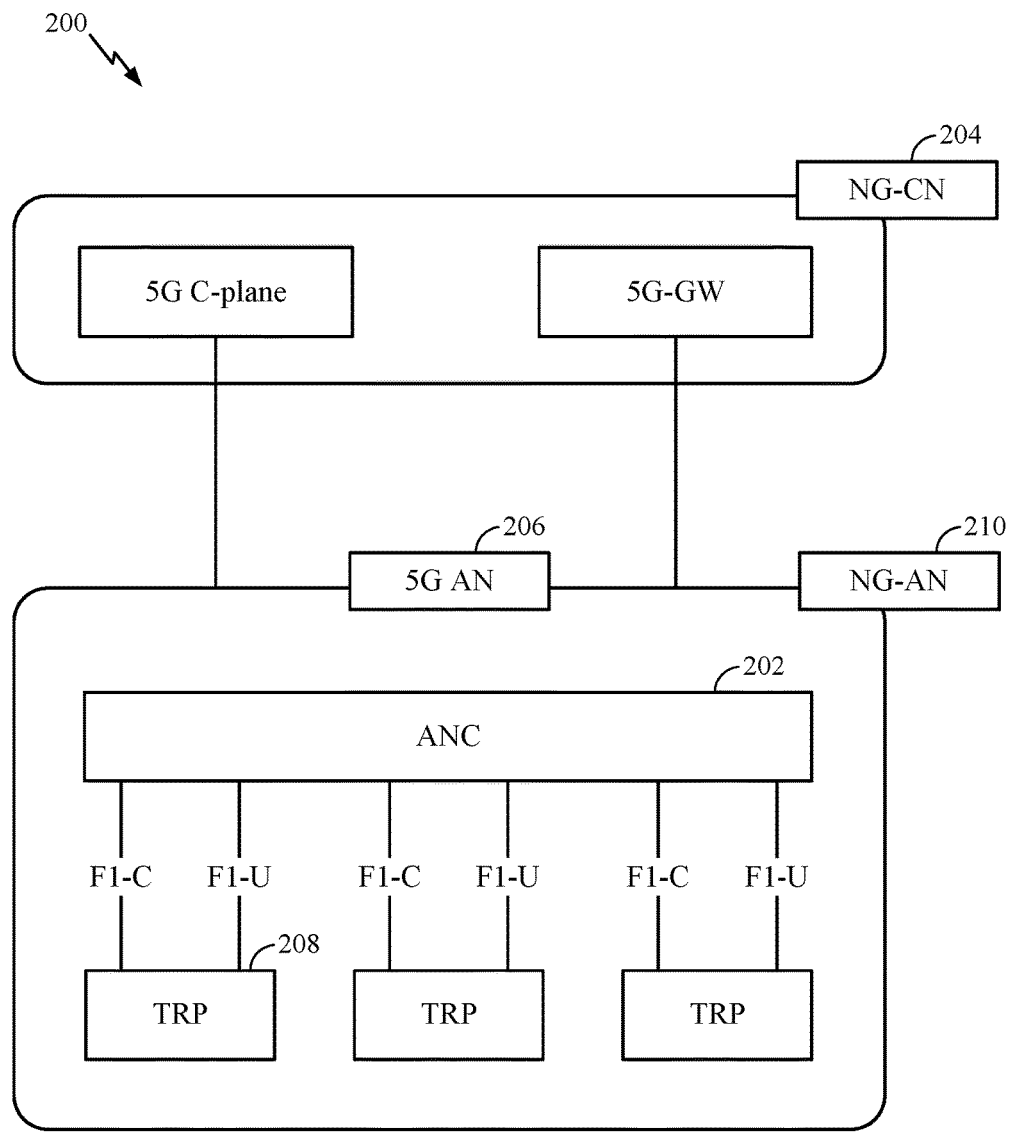
FIG. 2 is a block diagram illustrating an example logical architecture of a distributed RAN, in accordance with certain aspects of the present disclosure.

FIG. 2 illustrates an example logical architecture of a distributed Radio Access Network (RAN) 200, which may be implemented in the wireless communication system illustrated in FIG. 1. A 5G access node 206 may include an Access Node Controller (ANC) 202. The ANC may be a Central Unit (CU) of the distributed RAN 200. The backhaul interface to the Next Generation Core Network (NG-CN) 204 may terminate at the ANC. The backhaul interface to Neighboring Next Generation Access Nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A Transmission Reception Point (TRP) may include one or more antenna ports. The TRPs may be configured to individually (e.g., dynamic selection) or jointly (e.g., joint transmission) serve traffic to a UE.

The logical architecture 200 may be used to illustrate fronthaul definition. The logical architecture 200 may support fronthauling solutions across different deployment types. For example, the logical architecture 200 may be based on transmit network capabilities (e.g., bandwidth, latency, and/or jitter).

The logical architecture 200 may share features and/or components with LTE. The Next Generation Access Node (NG-AN) 210 may support dual connectivity with NR. The NG-AN 210 may share a common fronthaul for LTE and NR.

The logical architecture 200 may enable cooperation between and among TRPs 208. For example, cooperation may be preset within a TRP and/or across TRPs via the ANC 202. There may be no inter-TRP interface.

Logical architecture 200 may have a dynamic configuration of split logical functions. As will be described in more detail with reference to FIG. 5, the Radio Resource Control (RRC) layer, Packet Data Convergence Protocol (PDCP)

layer, Radio Link Control (RLC) layer, Medium Access Control (MAC) layer, and a Physical (PHY) layers may be adaptably placed at the DU or CU (e.g., TRP or ANC, respectively).

Figure 3:
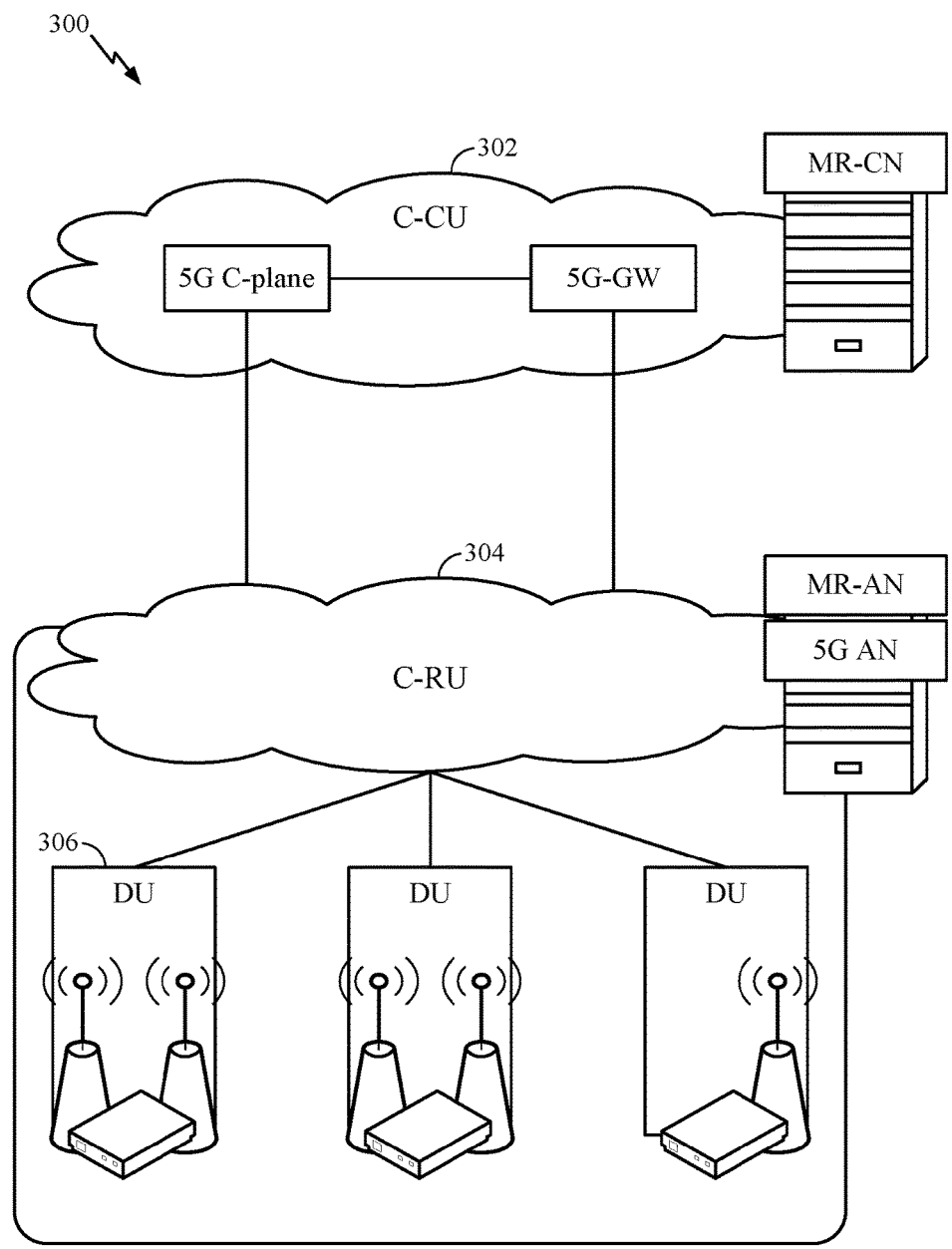
FIG. 3 is a diagram illustrating an example physical architecture of a distributed RAN, in accordance with certain aspects of the present disclosure.

FIG. 3 illustrates an example physical architecture 300 of a distributed Radio Access Network (RAN), according to aspects of the present disclosure. A Centralized Core Network Unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
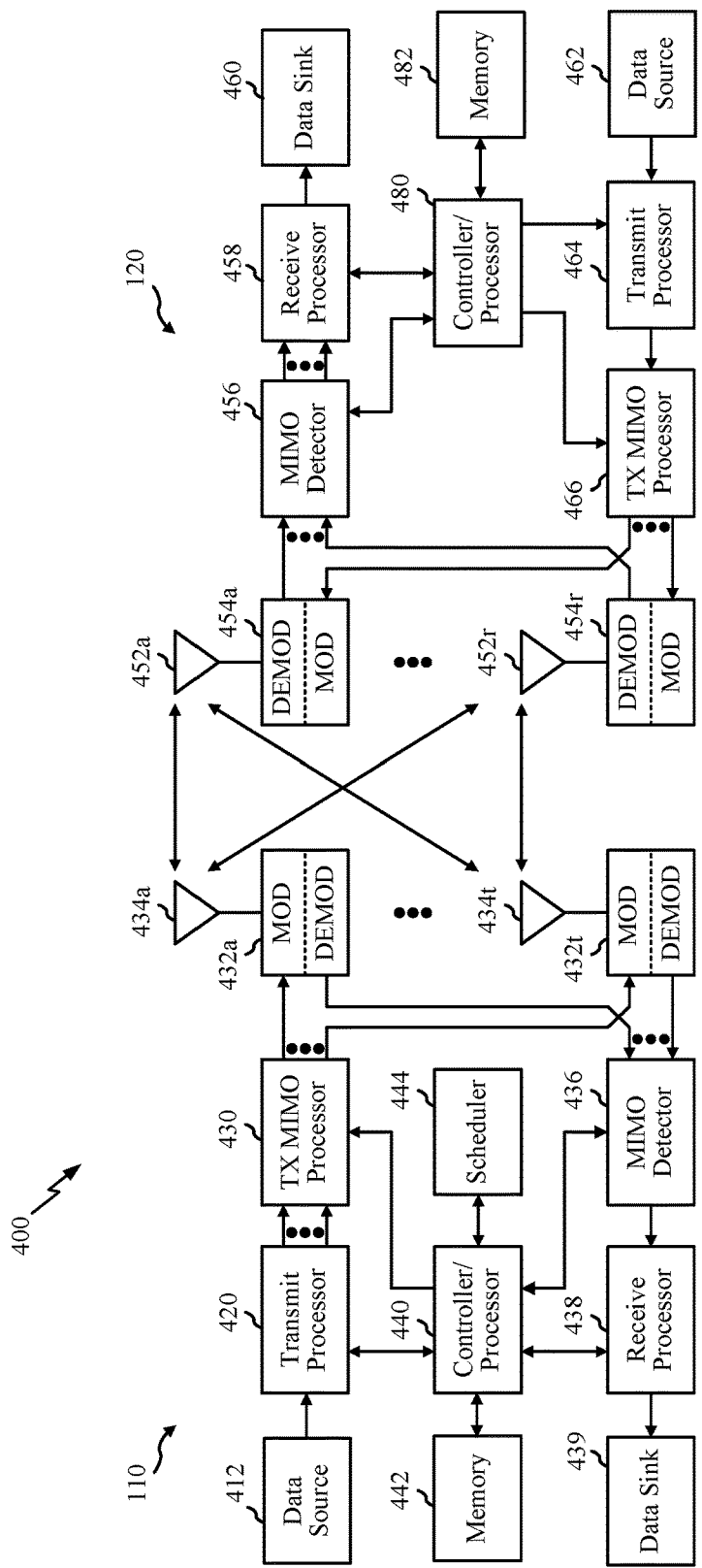
FIG. 4 is a block diagram conceptually illustrating a design of an example base station (BS) and user equipment (UE), in accordance with certain aspects of the present disclosure.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r. The BS may include a TRP and may be referred to as a Master eNB (MeNB) (e.g., Master BS or Primary BS). The Master BS and the Secondary BS may be geographically co-located.

One or more components of the BS 110 and UE 120 may be used to practice aspects of the present disclosure. For example, antennas 452, transceivers 454, detector 456, processors 466, 458, 464, and/or controller/processor 480 of the UE 120 and/or antennas 434, transceivers 432, detector 436, processors 420, 430, 438, and/or controller/processor 440 of the BS 110 may be used to perform the various techniques and methods described herein.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the Primary Synchronization Signal (PSS), Secondary Synchronization Signal (SSS), and Cell-Specific Reference Signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) within transceivers 432a through 432t. Each modulator may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from transceivers 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from the demodulators in transceivers 454a through 454r, perform MIMO detection on the received symbols if applicable, and provide detected symbols. A receive processor 458 may process (e.g., deinterleave and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the transceivers 432a through 432t, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for the BS 110 and the UE 120, respectively. A scheduler 444 may schedule UEs for data transmission on the downlink and/or uplink.

Figure 5:
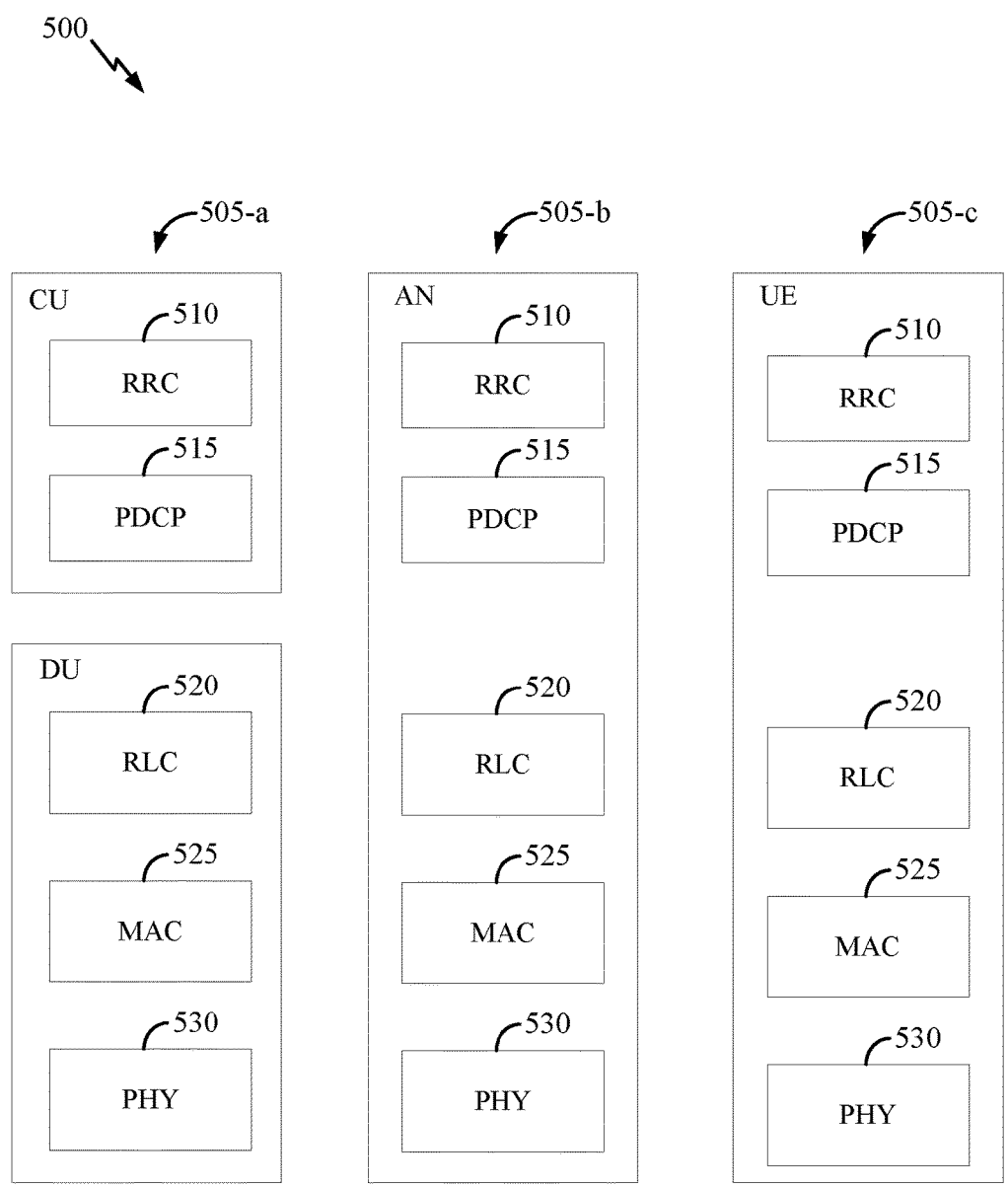
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., an access node (AN), a new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in, for example, a femto cell deployment.

Regardless of whether a network access device implements part or all of a protocol stack, a UE may implement an entire protocol stack as shown in 505-*c* (e.g., the RRC layer 510, the PDCP layer 515, the RLC layer 520, the MAC layer 525, and the PHY layer 530).

Figure 6:
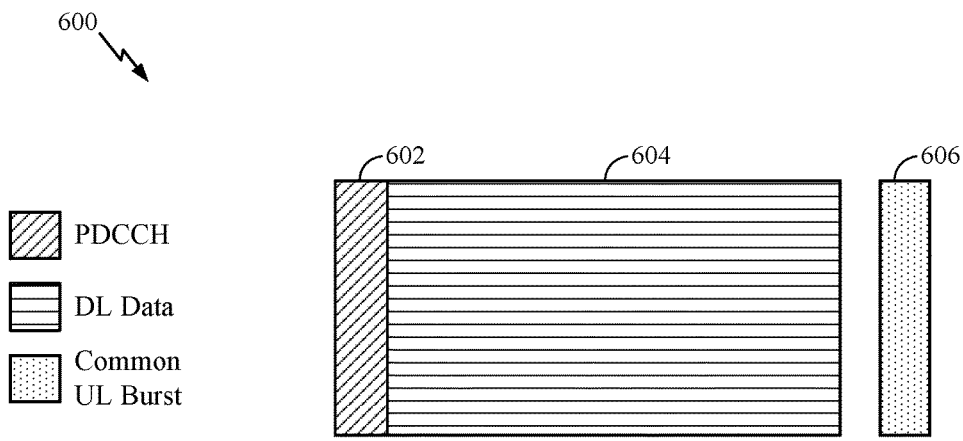
FIG. 6 illustrates an example of a DL-centric subframe, in accordance with certain aspects of the present disclosure.

FIG. 6 is a diagram showing an example of a DL-centric subframe 600, such as may be used with a RAT like NR. The DL-centric subframe 600 may include a control portion 602. The control portion 602 may exist in the initial or beginning portion of the DL-centric subframe 600. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe 600 may also include a DL data portion 604. The DL data portion 604 may be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
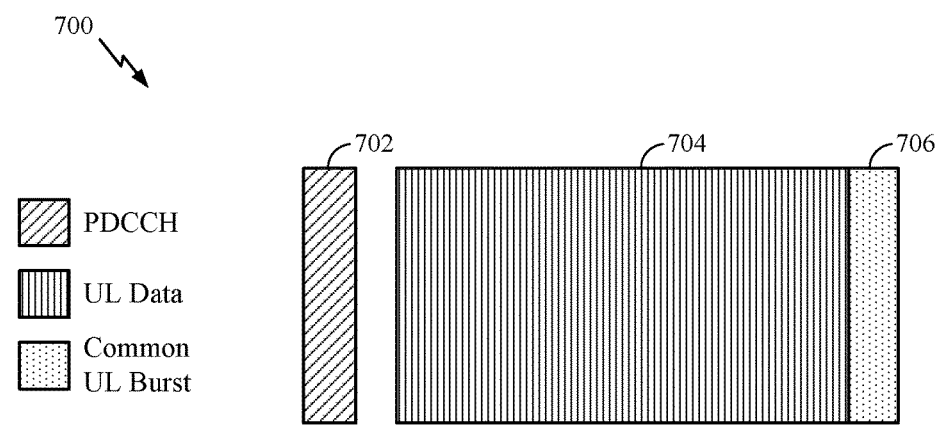
FIG. 7 illustrates an example of an UL-centric subframe, in accordance with certain aspects of the present disclosure.

FIG. 7 is a diagram showing an example of an UL-centric subframe 700. The UL-centric subframe 700 may include a control portion 702. The control portion 702 may exist in the initial or beginning portion of the UL-centric subframe. The control portion 702 in FIG. 7 may be similar to the control portion described above with reference to FIG. 6. The UL-centric subframe 700 may also include an UL data portion 704. The UL data portion 704 may sometimes be referred to as the payload of the UL-centric subframe 700. The UL portion may refer to the communication resources utilized to communicate UL data from the subordinate entity (e.g., UE) to the scheduling entity (e.g., UE or BS). In some configurations, the control portion 702 may be a physical UL control channel (PUCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Methods and Systems for Sharing an Uplink Channel in a Multiple Radio Access Technology Environment Different Radio Access Technologies (RATs) may operate on different frequencies or within different frequency bands so as to coexist in a service area without interference. For example, wireless communication networks utilizing New Radio (NR) radio access technology may operate in higher frequency bands as compared to wireless communication networks utilizing 4G, 3G, and other radio access technologies. Generally speaking, higher frequency radio access technologies may provide higher potential data rates, but may also suffer higher propagation loss and higher penetration loss compared to lower frequency radio access technologies.

On the downlink side of a wireless communication network, such as network 100 of FIG. 1, the losses associated with higher frequency radio access technologies may be mitigated by a variety of factors at a base station (BS), such as, for example, by transmitting at a higher power level and/or transmitting using beamforming techniques. These and other techniques may increase the effective range of a base station even when using higher frequency radio access technologies, such as NR.

On the uplink side of a communication network, the losses associated with higher frequency radio access technologies may be more difficult to mitigate. For example, because user equipments (UEs), such as UE 120 in FIGS. 1 and 4, may have limited ability to increase transmission power and have a limited number of antennas with which to perform beamforming. As such, the effective range of a UE's uplink using a higher frequency radio access technology may be limited compared to the UE's ability to receive data on the downlink.

One complication of the disparity in uplink and downlink ranges is that a UE may be able to receive data on a high-frequency downlink, but not be able to acknowledge the receipt of the data on a high-frequency uplink. This may cause the wireless network to try resending the data to the UE even though the UE has already received the data, thereby wasting network resources. Even where the UE may be able to acknowledge receiving the data, the UE may have to utilize a higher transmit power on the high-frequency uplink because of the propagation losses as compared to a lower frequency uplink.

Because UEs may be configured to operate using multiple radio access technologies at once, it is possible to mitigate the issues caused by a disparity in uplink and downlink ranges. In other words, a UE may continue to receive data using a higher frequency radio access technology on the downlink, but may switch to a lower frequency radio access technology on the uplink, thereby mitigating the range disparity between the radio access technologies. This may be referred to as sharing the uplink (i.e., sharing it with other UEs on the lower frequency radio access technology network) or utilizing a blended radio access technology uplink, or more simply, a blended uplink.

A UE may implement several strategies with respect to a blended uplink configuration, such as, for example: always using the lower frequency radio access technology for the uplink; using the lower frequency radio access technology only when the higher frequency radio access technology is unreliable or out of range; choosing between the radio access technologies based on characteristics of the data to be transmitted (e.g., high versus low priority, QoS, etc.); choosing between the radio access technologies based on characteristics of the UE (e.g., battery level, type of data being sent, etc.); and others.

Generally, base stations, such as base stations 110 in FIGS. 1 and 4, are configured to operate according to a single radio access technology at a time. For example, a particular base station may be operating as a NR base station, or as an LTE base station, but generally not both at once. However, base stations operating according to multiple radio access technologies may be collocated, such as on the same cell tower or in an adjacent location.

Accordingly, when a UE is using a blended uplink strategy (i.e., receiving data according to one radio access technology and sending data according to another radio access technology), the base stations for each respective radio access technology may be configured to share messages, such as acknowledgements (ACKs) and negative acknowledgements (NACKs), in order that network resources are not wasted. For example, if a first base station transmits data to a UE using a first (e.g., higher frequency) radio access technology (e.g., NR) and the UE thereafter transmits an ACK or NACK to a second, different base station using a second (e.g., lower frequency) radio access technology (e.g., LTE), the second base station may thereafter forward the ACK or NACK to the first base station so that the first base station is aware of the state of the data transmission. In this way, the first base station may know whether or not to re-transmit the data without receiving the ACK or NACK directly from the UE using the first (e.g., higher frequency) radio access technology.

Figure 8A:
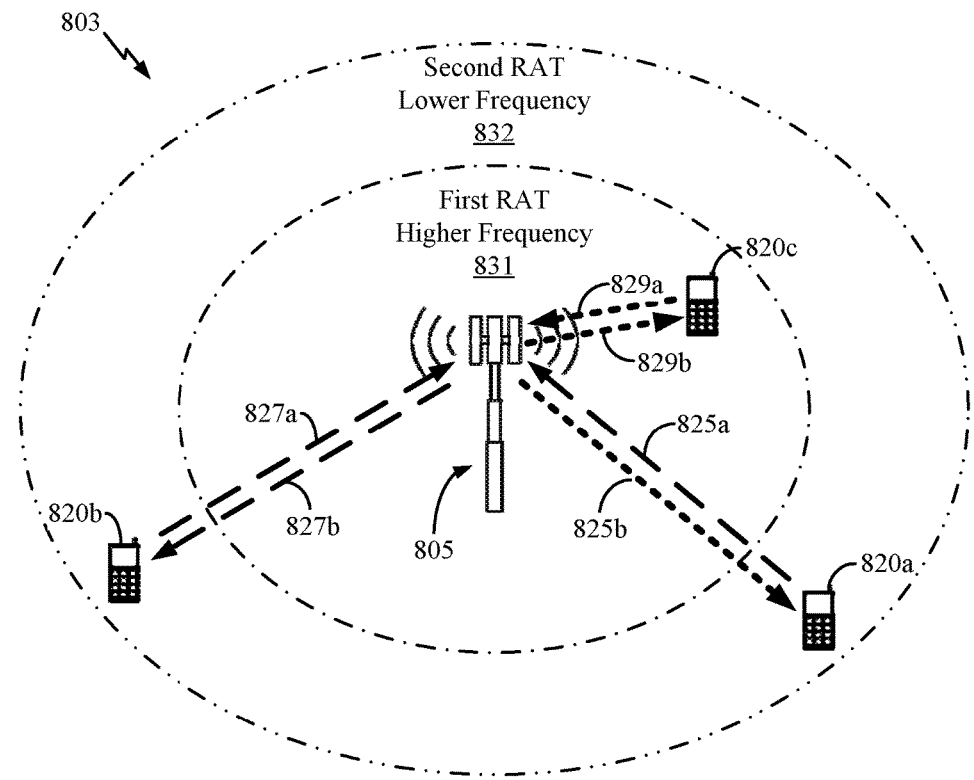
FIGS. 8A and 8B depict aspects of a radio access network implementing multiple radio access technologies, in accordance with certain aspects of the present disclosure.

FIG. 8A depicts aspects of a cell 803 in a radio access network. Tower 805 within cell 803 has multiple base stations (not shown) operating multiple radio access technologies, 831 and 832. Specifically, a first base station of tower 805 is operating a first radio access technology 831, such as NR or 5G, with a higher frequency (relative to the second radio access technology). The effective uplink range of first radio access technology 831 is shown by the broken ellipse with alternating dots and dashes. A second base station of tower 805 is operating a second radio access technology 832, such as LTE or 4G, with a lower frequency (relative to the first radio access technology). The effective uplink range of the second radio access technology 832 is shown by the broken ellipse with alternating double dots and dashes. As discussed above, the relatively higher frequency of the first radio access technology 831 results in shorter effective uplink range as compared to that of the second radio access technology 832.

As shown in FIG. 8A, user equipment 820a is able to receive data on a downlink 825b according to the first radio access technology 831 (e.g., NR) beyond the uplink range of the first radio access technology 831 because, for example, the first base station is able to use techniques such a beamforming to extend the downlink range. However, user equipment 820a is not able to transmit data on an uplink according to the first radio access technology 831 as it is out of range. Nevertheless, user equipment 820a is able to use a second, alternate radio access technology 832 (e.g., LTE) in order to transmit data on uplink 825a. For example, user equipment 820a may receive data at a relatively higher speed on downlink 825b according to the first radio access technology 831 and transmit data at a relatively lower speed on uplink 825a. The data transmitted on uplink 825a according to the second radio access technology 832 may be, for example, acknowledgement data, such as an ACK or NACK. The data transmitted on uplink 825a according to the second radio access technology 832 may also be normal user plane data, such as messaging data, internet requests, file uploads, voice data, video data, and the like.

In some instances, user equipment 820*a* may choose to transmit data on uplink 825*a* based on factors other than range. For example, the quality of the connection on 825*a* according to the second radio access technology may be better than the quality of an uplink connection using the first radio access technology (not shown). As another example, user equipment 820*a* may choose to transmit data on uplink 825*a* based on superior resource availability of uplink 825*a* as compared to an uplink connection using the first radio access technology (not shown). As yet another example, user equipment 820*a* may choose to transmit data on uplink 825*a* based on a power conservation policy if transmitting according to the second radio access technology is more power efficient compared to transmitting according to a first radio access technology. As yet another example, user equipment 820*a* may choose to transmit data on uplink 825*a* based on a quality of service (QoS) policy. These are but a few examples uplink strategies a user equipment can deploy.

User equipment 820*b* may not be configured to operate with the first radio access technology 831 or may be operating only the second radio access technology 832 by choice (e.g., in an effort to save its or the network's resources). As such, user equipment 820*b* receives data on downlink 827*b* according to the second radio access technology 832 and also uplinks data on uplink 827*a* according to the second radio access technology 832.

User equipment 820*c* may not be configured to operate with the second radio access technology 832 or may be operating only on the first radio access technology 832 by choice (e.g., based on a QoS requirement of the data be uploaded and downloaded). As such, user equipment 820*c* receives data on downlink 829*b* according to the first radio access technology 831 and also uplinks data on uplink 829*a* according to the first radio access technology 831.

Figure 8B:
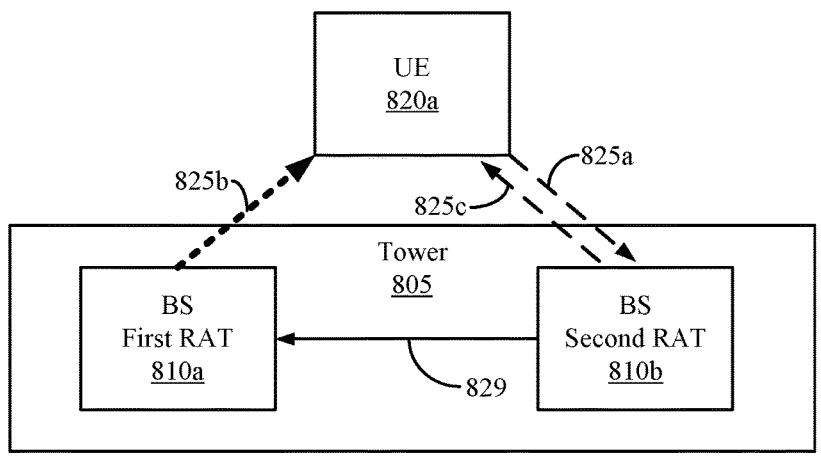

FIG. 8B depicts further aspects of tower 805. In particular, tower 805 includes two base stations, 810*a* and 810*b*. Base station 810*a* is operating a first radio access technology 831 (as shown in FIG. 8A), which is a relatively higher frequency technology (e.g., NR). Base station 810*b* is operating a second radio access technology 832 (as shown in FIG. 8A), which is a relatively lower frequency radio access technology (e.g., LTE). In other embodiments, base stations 810*a* and 810*b* may not be collocated. For example, base stations 810*a* and 810*b* may be associated with different towers adjacent to each other such that their radio coverage areas overlap.

User equipment 820*a* is receiving data transmitted from base station 810*a* via downlink 825*b* (e.g., on Physical Downlink Shared Channel (PDSCH)) according to the first radio access technology 831, and user equipment 820*a* is transmitting data to base station 810*b* via uplink 825*a* according to second radio access technology 832. Some of the data transmitted to base station 810*b* via uplink 825*a* may include acknowledgement data, such as ACKs and NACKs, which may be transmitted on, for example, a Physical Uplink Control Channel (PUCCH), according to the second radio access technology 832. In such a case, base station 810*b* may forward the acknowledgement data (and other control data) in a message 829 to base station 810*a*, for example, to acknowledge that user equipment 820*a* successfully received data via downlink 825*b*. In some embodiments, the message 829 may be transmitted between base stations via a wired data connection between the base station 810*b* and 810*a*. In other embodiments the message 829 may be transmitted between base stations via a wireless data connection between the base station 810*b* and 810*a*. In either case, message 829 may flow directly between the base stations or indirectly, e.g., via a network connection and other devices (not shown).

In some embodiments, user equipment 820*a* may receive downlink data simultaneously from two or more base stations operating two different radio access technologies, such as base station 810*a* and 810*b*. For example, user equipment 820*a* may receive downlink data on downlink 825*c* according to the second radio access technology while also receiving downlink data on downlink 825*b* according to the first radio access technology.

In instances where user equipment 820*a* is receiving data from more than one base station (e.g., base stations 810*a* and 810*b*) according to two different radio access technologies (e.g., 831 and 832), the user equipment may transmit acknowledgement data to each base station separately, if possible. If, however, user equipment is not able to transmit acknowledgement data on an uplink to both base stations (e.g., not able to transmit to base station 810*a*), user equipment 820*a* may instead bundle acknowledgment data meant for both base stations and transmit the acknowledgement data on a single uplink, such as uplink 825*a*, to a single base station, such as 810*b*. In such cases, the second base station 810*b* may receive acknowledgement data regarding the data it transmitted to user equipment 820*a* via downlink 825*c* and forward additional acknowledgement data regarding data transmitted on a different downlink (e.g., 825*b*) to another base station, such as base station 810*a*, in a message 829. In this way, user equipment 820*a* is able to acknowledge successful or unsuccessful reception of multiple downlink data streams (e.g., 825*b* and 825*c*) according to multiple radio access technologies while maintaining a single uplink data stream (e.g., 825*a*).

User equipment 820*a* may combine or otherwise bundle acknowledgement data (e.g., ACKs and NACKs) using a variety of techniques. For example, user equipment 820*a* may encode acknowledgement data using binary phase shift keying (BPSK) modulation or quadrature phase shift keying (QPSK) modulation. In the case of BPSK, user equipment 820*a* may use the single bit to indicate successful or unsuccessful reception of data, e.g., received via downlink 825*b*. User equipment 820*a* could also use a single bit to indicate successful or unsuccessful reception of data on more than one downlink. However, with only a single bit used to indicate information about more than one downlink, user equipment 820*a* would only be able to indicate an overall success or failure without regard to which particular link failed or succeeded. Other modulation schemes may be used to provide even more data, such as 16-Quadrature Amplitude Modulation (QAM), 64-QAM, and others.

In the case of QPSK, user equipment 820*a* may use two bits to indicate successful or unsuccessful receipt of data on more than one downlink, e.g., on downlinks 825*b* and 825*c*. In such a case, a base station, such as base station 810*b*, may determine the success or failure of a transmission according to a first radio access technology (e.g., 831) according to a first bit and may determine the success or failure of a transmission according to a second radio access technology (e.g., 832) according to a second bit encoded in a single transmission. The base station receiving the multiple bit acknowledgment data (e.g., 810*b*) may receive and act upon acknowledgement data intended for itself and forward the remaining acknowledgement data to another base station (e.g., 810*a*). Notably, BPSK and QPSK are merely two examples of methods for encoding acknowledgment data, and many other methods are possible as are known in the art.

Figure 9:
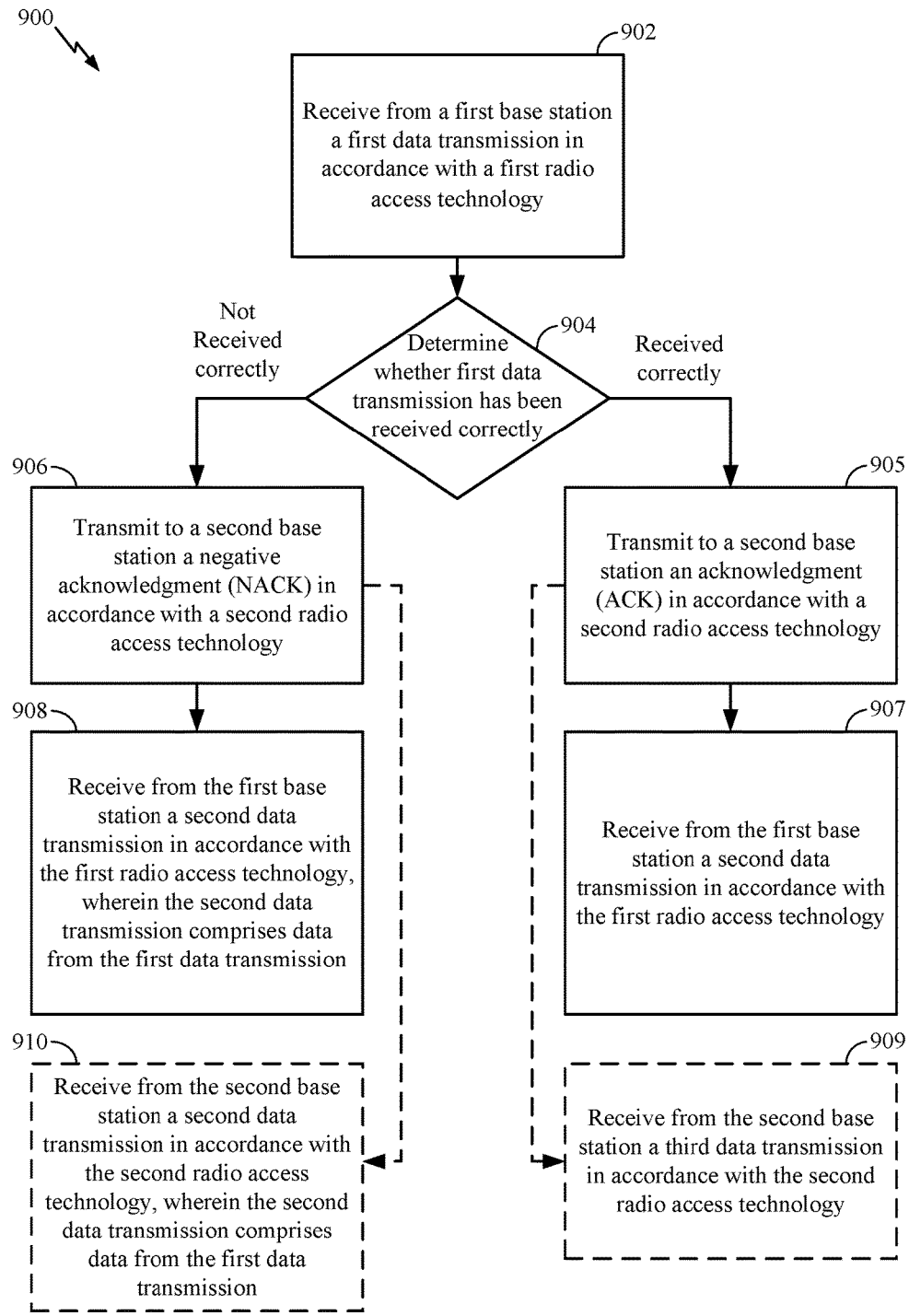
FIG. 9 depicts an embodiment of a method for providing acknowledgment data from a user equipment in a multiple radio access technology environment, in accordance with certain aspects of the present disclosure.

FIG. 9 depicts an embodiment of a method 900 for providing acknowledgment data from a user equipment in a multiple radio access technology environment.

The method 900 begins at step 902, where a user equipment receives a first data transmission in accordance with a first radio access technology. For example, the user equipment may receive the first data transmission on a first physical downlink shared channel (PDSCH), such as downlink 825b in FIG. 8A, and the first radio access technology may be NR or 5G.

The method 900 proceeds to step 904, where the user equipment determines whether first data transmission has been received correctly. For example, the user equipment may compute cyclic redundancy check (CRC) bits based on the received data and compare the computed CRC bits to CRC bits transmitted with the data to determine that the first data transmission has been received correctly.

If the user equipment determines that it has received the first data transmission correctly at step 904, then the method 900 moves to step 905.

At step 905, the user equipment transmits to a second base station an acknowledgment (ACK) in accordance with a second radio access technology. For example, the user equipment may transmit the ACK on a physical uplink control channel (PUCCH) in accordance with LTE or 4G. Notably, the processing of the ACK at the second base station will be discussed further with respect to FIGS. 10A and 10B. The ACK may indicate correct reception of the first data transmission in accordance with the first radio access technology.

The user equipment may choose to transmit the ACK to a second base station according to a second radio access technology at step 905 for a variety of reasons, such as those discussed above with respect to UE 820a and FIG. 8A (e.g., because the user equipment is out of uplink range, for power saving, QoS considerations, etc.). In some instances, the user equipment may receive from the second base station an indication to reserve a resource block in the physical uplink control channel in accordance with the second radio access technology for transmission of the at ACK (or, alternatively a NACK) in accordance with the first radio access technology.

The method 900 then proceeds to step 907, where the user equipment receives from the first base station a second data transmission in accordance with the first radio access technology. For example, the second data transmission may include new data as compared to the first data transmission because the user equipment acknowledged correct reception of the first data transmission.

The method 900 may also proceed to optional step 909 (as indicated by the broken lines), where the user equipment receives from the second base station a third data transmission in accordance with the second radio access technology. In this example, the user equipment is actually receiving data utilizing downlinks according to the first radio access technology and the second radio access technology in a concurrent or alternating fashion (e.g., according to a time division duplex strategy). In this way, the user equipment may experience a higher overall data throughput as compared to using only a single downlink.

Going back to step 904, if the user equipment determines that it has not received the first data transmission correctly, then the method 900 moves to step 906. For example, the user equipment may compute CRC bits based on the received data and compare the computed CRC bits to CRC bits transmitted with the data to determine that the first data transmission has not been received correctly At step 906, the user equipment transmits to a second base station a negative acknowledgment (NACK) in accordance with a second radio access technology. For example, the user equipment may transmit the NACK on a physical uplink control channel (PUCCH) in accordance with the second radio access technology. Notably, the processing of the NACK at the second base station will be discussed further with respect to FIGS. 10A and 10B. The NACK may indicate incorrect reception of the first data transmission in accordance with the first radio access technology.

The method then proceeds to step 908, where the user equipment receives from the first base station a second data transmission in accordance with the first radio access technology. In this case, the second data transmission comprises data from the first data transmission. In other words, the base station re-transmits some or all of the data from the first data transmission in the second data transmission in response to the user equipment sending a NACK based on the first data transmission.

The method 900 may also proceed to optional step 910 (as indicated by the broken lines), where the user equipment receives from the second base station a second data transmission in accordance with the second radio access technology. In this example, the user equipment is receiving redundant data utilizing downlinks according to the first radio access technology and the second radio access technology in order to improve the chances of successful reception of the data. In this way, the user equipment may experience a lower overall transmission error rate as compared to using only a single downlink.

Notably, while the preceding discussion related to FIG. 9 referred to NR and 5G as examples of first radio access technologies and LTE and 4G as examples of second radio access technologies, those technologies are merely exemplary. By way of example, the first radio access technology may be LTE/4G and the second radio access technology may be CDMA/3G, instead, or may be other radio access technologies discussed herein and later developed.

Figure 10A:
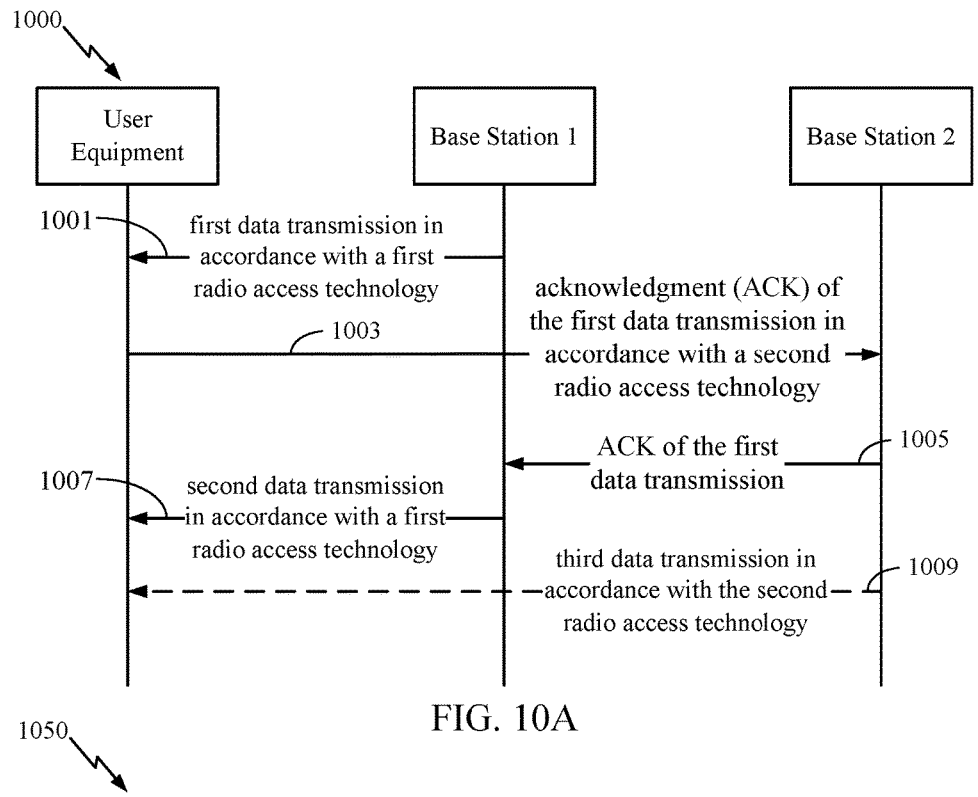
FIGS. 10A and 10B depict an embodiment of a method for processing acknowledgment data from a user equipment in a multiple radio access technology environment, in accordance with certain aspects of the present disclosure.

FIG. 10A depicts an example method 1000 for processing acknowledgment data from a user equipment in a multiple radio access technology environment. At step 1001, a first base station, such as base station 810a in FIG. 8B, transmits to the user equipment, such as UE 820a in FIG. 8B, a first data transmission in accordance with a first radio access technology, such as RAT 831 in FIG. 8A. For example, the first base station may transmit the first data transmission on a first physical downlink shared channel (PDSCH) according to NR or 5G.

At step 1003, a second base station, such as base station 810b in FIG. 8B, receives from the user equipment an acknowledgment (ACK) of the first data transmission in accordance with a second radio access technology. For example, the second base station may receive the ACK on a first physical uplink control channel (PUCCH) according to LTE or 4G.

At step 1005, the second base station transmits to the first base station the ACK of the first data transmission. In some examples, the second base station may forward a message, such as message 829 of FIG. 8B, to the first base station directly, i.e., without further processing the data. In other examples, the second base station may process the acknowledgment data received from the user equipment and thereafter transmit a new message to the first base station, which may omit some data from the original acknowledgement data. Thus, the first base station is able to determine that the first data transmission was successfully transmitted to the user equipment despite the user equipment not transmitting any acknowledgment data directly to the first base station.

At step 1007, the first base station transmits to the user equipment a second data transmission in accordance with the first radio access technology.

At step 1009, the second base optionally transmits to the user equipment a third data transmission in accordance with the second radio access technology. As explained above with respect to step 909 of FIG. 9, in this example, the user equipment may receive data from the first base station and the second base station utilizing downlinks according to the first radio access technology and the second radio access technology, respectively, in a concurrent or alternating fashion (e.g., according to a time division duplex strategy). In this way, the user equipment may experience a higher overall data throughput as compared to using only a single downlink.

Figure 10B:
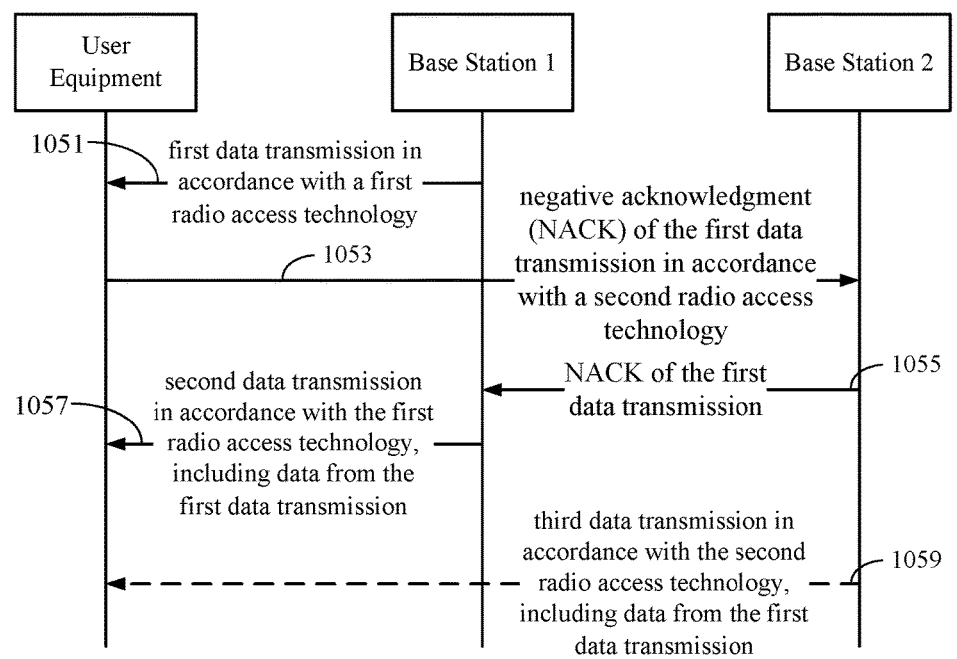

FIG. 10B depicts another example method 1050 for processing acknowledgment data from the user equipment in the multiple radio access technology environment.

At step 1051, the first base station transmits to the user equipment a first data transmission in accordance with the first radio access technology, such as NR or 5G.

At step 1053, the second base station receives from the user equipment a negative acknowledgment (NACK) of the first data transmission in accordance with the second radio access technology, such as LTE or 4G.

At step 1055, the second base station transmits to the first base station the NACK of the first data transmission. As above, the second base station may forward the message to the first base station directly or may process the acknowledgment data received from the user equipment and thereafter transmit a new message to the first base station. Thus, here the first base station is able to determine that the first data transmission was not successfully transmitted to the user equipment despite the user equipment not transmitting any acknowledgment data directly to the first base station.

At step 1057, the first base station transmits to the user equipment a second data transmission in accordance with the first radio access technology. In this example, the second data transmission comprises data from the first data transmission. In this regard, the second data transmission may be alternatively referred to as a re-transmission of the first data transmission.

At step 1059, the second base station optionally transmits to the user equipment a third data transmission in accordance with the second radio access technology. As explained above with respect to step 910 of FIG. 9, in this example, the user equipment may receive redundant data utilizing downlinks according to the first radio access technology and the second radio access technology in order to improve the chances of successful reception of the data. In this way, the user equipment may experience a lower overall transmission error rate as compared to using only a single downlink.

As with the discussion of FIG. 9, the preceding discussion related to FIGS. 10A and 10B referred to NR and 5G as examples of first radio access technologies and LTE and 4G as examples of second radio access technologies, those technologies are merely exemplary. By way of example, the first radio access technology may be LTE/4G and the second radio access technology may be CDMA/3G, instead, or may be other radio access technologies discussed herein and later developed.

The aforementioned systems and methods for transmitting and processing acknowledgment data from a user equipment in a multiple radio access technology environment may improve the performance of the radio access network in several material aspects. For example, the reliability of the uplink acknowledgement data (e.g., ACKs and NACKs) used in the automatic repeat request (ARQ) and hybrid automatic repeat request (HARQ) may be improved, which may beneficially reduce the amount of unnecessary retransmissions of data in the user plane, and may also beneficially reduce the amount of additional control data in the control plane. A reduction in unnecessary retransmissions may increase resource utilization in the radio access network and may reduce latency.

Another improvement to the radio access network may be increased and more efficient usage of a first radio access technology downlink, such as a higher frequency radio access technology like NR or 5G, despite a user equipment being out of uplink range for that first radio access technology. This is because a user equipment that cannot acknowledge successful receipt of data on the first radio access technology also cannot continue receiving data on that first radio access technology. Instead, that user equipment will have to contend with other users using a second radio access technology, such as a lower frequency radio access technology like LTE or 4G. However, if the user equipment exploits a second radio access technology to continue acknowledging data received on the first radio access technology, then the resource of the radio access network as a whole (including the first and second radio access technologies) may be used more efficiently. For example, a first user equipment configured to use the first radio access technology on the downlink will not need to contend with a second user equipment that is only capable of using a second radio access technology.

Figure 11A:
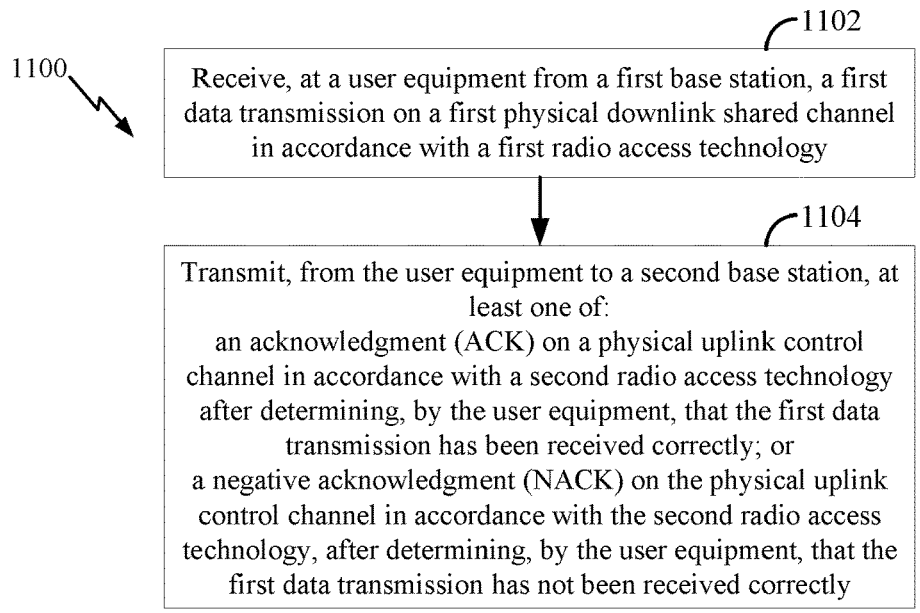
FIG. 11A depicts an embodiment of a method for providing acknowledgment data from a user equipment in a multiple radio access technology environment

FIG. 11A depicts an embodiment of a method 1100 for providing acknowledgment data from a user equipment in a multiple radio access technology environment. The method begins at step 1102, where a user equipment receives from a first base station, a first data transmission on a first physical downlink shared channel in accordance with a first radio access technology. For example, referring back to FIG. 8B, the user equipment 820a may receive from the base station 810a a first data transmission on downlink 825b in accordance with a first radio access technology, such as NR or 5G.

The method 1100 then proceeds to step 1102, where the user equipment transmits to a second base station, at least one of: an acknowledgment (ACK) on a physical uplink control channel in accordance with a second radio access technology after determining, by the user equipment, that the first data transmission has been received correctly; or a negative acknowledgment (NACK) on the physical uplink control channel in accordance with the second radio access technology, after determining, by the user equipment, that the first data transmission has not been received correctly. For example, referring back to FIG. 8B, the user equipment 820a may transmit an ACK or NACK on uplink 825a to base station 810b in accordance with a second radio access technology, such as LTE or 4G.

Figure 11B:
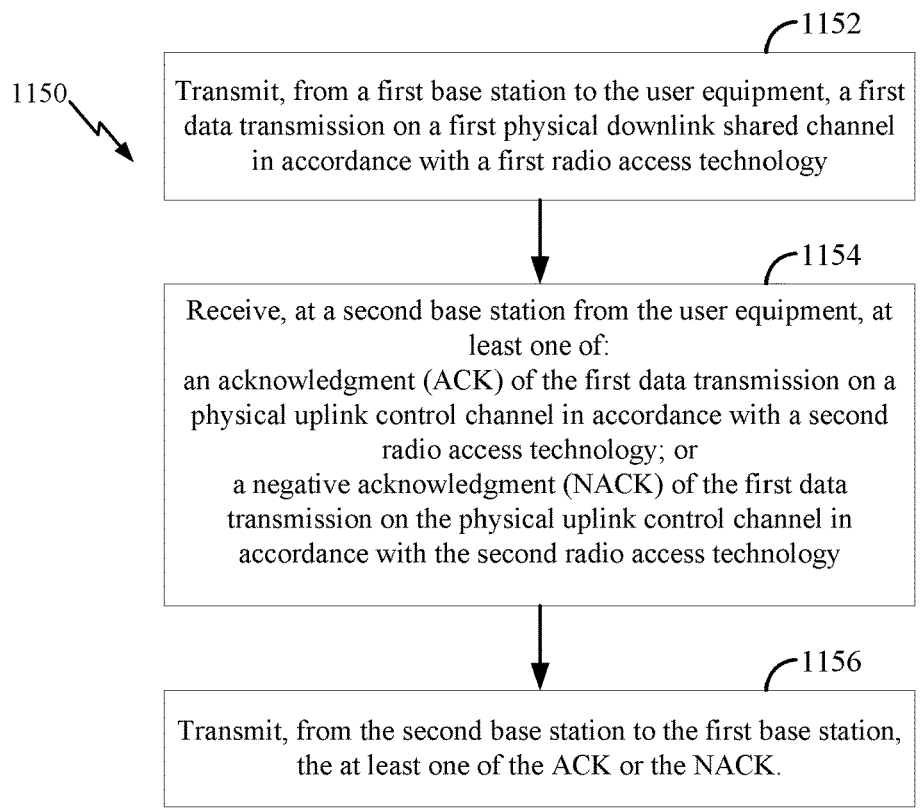
FIG. 11B depicts an embodiment of a method for processing acknowledgment data from a user equipment in a multiple radio access technology environment

FIG. 11B depicts an embodiment of a method 1150 for processing acknowledgment data from a user equipment in a multiple radio access technology environment. The method begins at step 1152 where a first base station transmits to the user equipment, a first data transmission on a first physical downlink shared channel in accordance with a first radio access technology. For example, referring back to FIG. 8B, the user base station 810 may transmit to equipment 820a a first data transmission on downlink 825b in accordance with a first radio access technology, such as NR or 5G.

The method 1150 then proceeds to step 1154, where a second base station receives from the user equipment, at least one of: an acknowledgment (ACK) of the first data transmission on a physical uplink control channel in accordance with a second radio access technology; or a negative acknowledgment (NACK) of the first data transmission on the physical uplink control channel in accordance with the second radio access technology. For example, referring back to FIG. 8B, the base station 8210b may receive an ACK or NACK on uplink 825a to user equipment 820a in accordance with a second radio access technology, such as LTE or 4G.

The method 1150 then proceeds to step 1156 where the second base station transmits to the first base station, the at least one of the ACK or the NACK. For example, referring back to FIG. 8B, the base station 810b may transmit the received ACK or NACK to base station 810a via message 829.

Figure 12:
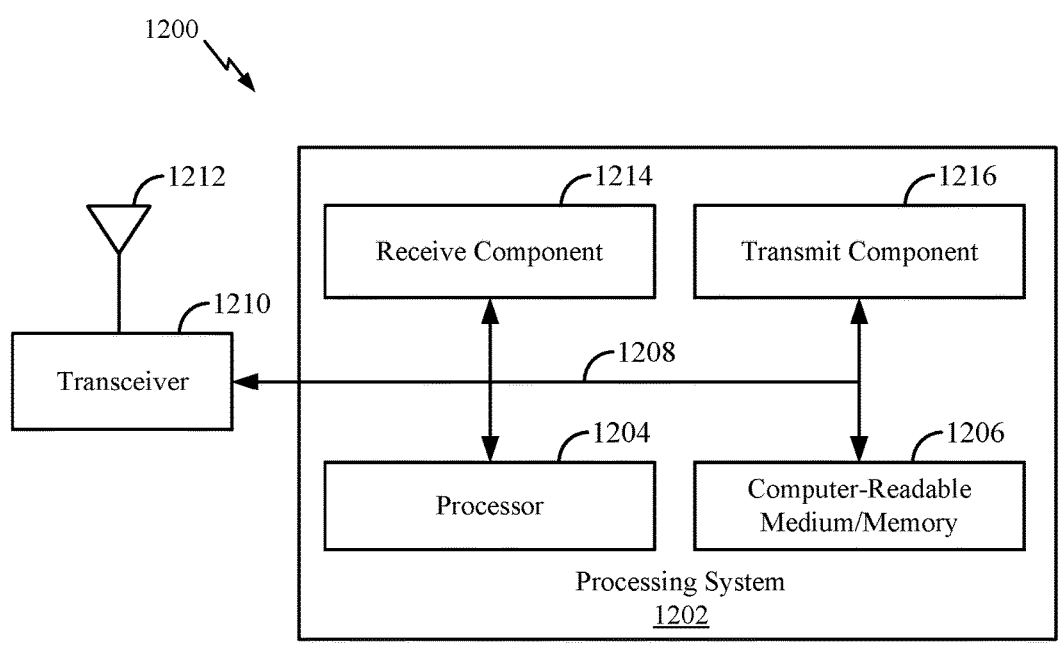
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIGS. 8A-8B, 9, 10A-10B, and 11A-11B. The communications device 1200 includes a processing system 1202 coupled to a transceiver 1210. The transceiver 1210 is configured to transmit and receive signals for the communications device 1200 via an antenna 1212, such as the various signal described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1206 via a bus 1208. In certain aspects, the computer-readable medium/memory 1206 is configured to store computer-executable instructions that when executed by processor 1204, cause the processor 1204 to perform the operations illustrated in FIGS. 8A-8B, 9, 10A-10B, and 11A-11B, or other operations for performing the various techniques discussed herein.

In certain aspects, the processing system 1202 further includes a receive component 1214 for performing the operations illustrated in FIGS. 8A-8B, 9, 10A-10B, and 11A-11B. Additionally, the processing system 1202 includes a transmit component 1216 for performing the operations illustrated in FIGS. 8A-8B, 9, 10A-10B, and 11A-11B. The receive component 1214 and transmit component 1216 may be coupled to the processor 1204 via bus 1208. In certain aspects, the receive component 1214 and transmit component 1216 may be hardware circuits. In certain aspects, the receive component 1214 and transmit component 1216 may be software components that are executed and run on processor 1204.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 8A, 8B, 9, 10A, and 10B.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for providing acknowledgment data from a user equipment in a multiple radio access technology environment, comprising:
   receiving, at the user equipment from a first base station, a first data transmission on a first physical downlink shared channel in accordance with a first radio access technology; and
   transmitting, from the user equipment to a second base station, at least one of:
      an acknowledgment (ACK) on a physical uplink control channel in accordance with a second radio access technology after determining, by the user equipment, that the first data transmission has been received correctly; or a negative acknowledgment (NACK) on the physical uplink control channel in accordance with the second radio access technology, after determining, by the user equipment, that the first data transmission has not been received correctly, wherein a first bit of the at least one of the ACK or the NACK is configured for use by the first base station in accordance with the first radio access technology, and wherein a second bit of the at least one of the ACK or the NACK is configured for use by the second base station in accordance with the second radio access technology.

2. The method of claim 1, further comprising: receiving, at the user equipment from the second base station, an indication to reserve a resource block in the physical uplink control channel in accordance with the second radio access technology for transmission of the at least one of the ACK or the NACK in accordance with the first radio access technology.

3. The method of claim 1, wherein the first radio access technology is one of NR or 5G and the first base station is a gNodeB.

4. The method of claim 3, wherein the second radio access technology is one of LTE or 4G and the second base station is an eNodeB.

5. The method of claim 1, further comprising:
receiving, at the user equipment from the first base station, a second data transmission on the first physical downlink shared channel in accordance with the first radio access technology after transmitting, from the user equipment to the second base station, the NACK,
wherein the second data transmission comprises data from the first data transmission.

6. The method of claim 1, further comprising:
receiving, at the user equipment from the second base station, a second data transmission on a second physical downlink shared channel in accordance with the second radio access technology after transmitting, from the user equipment to the second base station, the NACK,
wherein the second data transmission comprises data from the first data transmission.

7. The method of claim 1, wherein the at least one of the ACK or the NACK is encoded using one of binary phase shift keying (BPSK) modulation or quadrature phase shift keying (QPSK) modulation.

8. The method of claim 1, further comprising:
receiving, at the user equipment from the second base station, a second data transmission on a second physical downlink shared channel in accordance with the second radio access technology,
wherein the ACK is configured to indicate to the second base station a correct reception by the user equipment of both the first data transmission and the second data transmission, and
wherein the NACK is configured to indicate to the second base station an incorrect reception by the user equipment of either the first data transmission or the second data transmission, or both.

9. A user equipment for wireless communication in a multiple radio access technology environment, comprising:

a memory comprising executable instructions; and
a processor configured to execute the executable instructions and cause the user equipment to:
receive, at the user equipment from a first base station, a first data transmission on a first physical downlink shared channel in accordance with a first radio access technology; and
transmit, from the user equipment to a second base station, at least one of:
an acknowledgment (ACK) on a physical uplink control channel in accordance with a second radio access technology after determining, by the user equipment, that the first data transmission has been received correctly; or
a negative acknowledgment (NACK) on the physical uplink control channel in accordance with the second radio access technology, after determining, by the user equipment, that the first data transmission has not been received correctly,
wherein a first bit of the at least one of the ACK or the NACK is configured for use by the first base station in accordance with the first radio access technology, and
wherein a second bit of the at least one of the ACK or the NACK is configured for use by the second base station in accordance with the second radio access technology.

10. The user equipment of claim 9, wherein the processor is further configured to cause the user equipment to: receive, at the user equipment from the second base station, an indication to reserve a resource block in the physical uplink control channel in accordance with the second radio access technology for transmission of the at least one of the ACK or the NACK in accordance with the first radio access technology.

11. The user equipment of claim 9, wherein the first radio access technology is one of NR or 5G and the first base station is a gNodeB.

12. The user equipment of claim 11, wherein the second radio access technology is one of LTE or 4G and the second base station is an eNodeB.

13. The user equipment of claim 9, wherein the processor is further configured to cause the user equipment to:
receive, at the user equipment from the first base station, a second data transmission on the first physical downlink shared channel in accordance with the first radio access technology after transmitting, from the user equipment to the second base station, the NACK,
wherein the second data transmission comprises data from the first data transmission.

14. The user equipment of claim 9, wherein the processor is further configured to cause the user equipment to:
receive, at the user equipment from the second base station, a second data transmission on a second physical downlink shared channel in accordance with the second radio access technology after transmitting, from the user equipment to the second base station, the NACK,
wherein the second data transmission comprises data from the first data transmission.

15. The user equipment of claim 9, wherein the at least one of the ACK or the NACK are encoded using one of binary phase shift keying (BPSK) modulation or quadrature phase shift keying (QPSK) modulation.

16. The user equipment of claim 9, wherein the processor is further configured to cause the user equipment to:
receive, at the user equipment from the second base station, a second data transmission on a second physical downlink shared channel in accordance with the second radio access technology,
wherein the ACK is configured to indicate to the second base station a correct reception by the user equipment of both the first data transmission and the second data transmission, and
wherein the NACK is configured to indicate to the second base station an incorrect reception by the user equipment of either the first data transmission or the second data transmission or both.

17. A method for processing acknowledgment data from a user equipment in a multiple radio access technology environment, comprising:
transmitting, from a first base station to the user equipment, a first data transmission on a first physical downlink shared channel in accordance with a first radio access technology;
receiving, at a second base station from the user equipment, at least one of:
an acknowledgment (ACK) of the first data transmission on a physical uplink control channel in accordance with a second radio access technology; or
a negative acknowledgment (NACK) of the first data transmission on the physical uplink control channel in accordance with the second radio access technology,
wherein a first bit of the at least one of the ACK or the NACK is configured for use by the first base station in accordance with the first radio access technology, and
wherein a second bit of the at least one of the ACK or the NACK is configured for use by the second base station in accordance with the second radio access technology; and
transmitting, from the second base station to the first base station, the at least one of the ACK or the NACK.

18. The method of claim 17, further comprising: transmitting, from the second base station to the user equipment, an indication to reserve a resource block in the physical uplink control channel in accordance with the second radio access technology for transmission of the at least one of the ACK or the NACK in accordance with the first radio access technology.

19. The method of claim 17, wherein the first radio access technology is one of NR or 5G and the first base station is a gNodeB.

20. The method of claim 18, wherein the second radio access technology is one of LTE or 4G and the second base station is an eNodeB.

21. The method of claim 17, further comprising:
transmitting, from the first base station to the user equipment, a second data transmission on the first physical downlink shared channel in accordance with the first radio access technology after receiving, at the second base station from the user equipment, the NACK,
wherein the second data transmission comprises data from the first data transmission.

22. The method of claim 17, further comprising:
transmitting, from the second base station to the user equipment, a second data transmission on a second physical downlink shared channel in accordance with the second radio access technology after receiving, at the second base station from the user equipment, the NACK,
wherein the second data transmission comprises data from the first data transmission.

23. A system for processing acknowledgment data from a user equipment in a multiple radio access technology environment, comprising:
a memory comprising executable instructions; and
a processor configured to execute the executable instructions and cause the system to:
transmit, from a first base station to the user equipment, a first data transmission on a first physical downlink shared channel in accordance with a first radio access technology;
receive, at a second base station from the user equipment, at least one of:
an acknowledgment (ACK) of the first data transmission on a physical uplink control channel in accordance with a second radio access technology; or
a negative acknowledgment (NACK) of the first data transmission on the physical uplink control channel in accordance with the second radio access technology,
wherein a first bit of the at least one of the ACK or the NACK is configured for use by the first base station in accordance with the first radio access technology, and
wherein a second bit of the at least one of the ACK or the NACK is configured for use by the second base station in accordance with the second radio access technology; and
transmit, from the second base station to the first base station, at least one of the ACK or the NACK.

24. The system of claim 23, wherein the processor is further configured to cause the system to: transmit, from the second base station to the user equipment, an indication to reserve a resource block in the physical uplink control channel in accordance with the second radio access technology for transmission of the at least one of the ACK or the NACK in accordance with the first radio access technology.

25. The system of claim 23, wherein the first radio access technology is one of NR or 5G and the first base station is a gNodeB.

26. The system of claim 24, wherein the second radio access technology is one of LTE or 4G and the second base station is an eNodeB.

27. The system of claim 23, wherein the processor is further configured to cause the system to:
transmit, from the first base station to the user equipment, a second data transmission on the first physical downlink shared channel in accordance with the first radio access technology after receiving, at the second base station from the user equipment, the NACK,
wherein the second data transmission comprises data from the first data transmission.

28. The system of claim 23, wherein the processor is further configured to cause the system to:
transmit, from the second base station to the user equipment, a second data transmission on a second physical downlink shared channel in accordance with the second radio access technology after receiving, at the second base station from the user equipment, the NACK,
wherein the second data transmission comprises data from the first data transmission.

29. A method for providing acknowledgment data from a user equipment in a multiple radio access technology environment, comprising:

receiving, at the user equipment from a first base station, a first data transmission on a first physical downlink shared channel in accordance with a first radio access technology; and transmitting, from the user equipment to a second base station, at least one of:
- an acknowledgment (ACK) on a physical uplink control channel in accordance with a second radio access technology after determining, by the user equipment, that the first data transmission has been received correctly; or
- a negative acknowledgment (NACK) on the physical uplink control channel in accordance with the second radio access technology, after determining, by the user equipment, that the first data transmission has not been received correctly; and receiving, at the user equipment from the second base station, a second data transmission on a second physical downlink shared channel in accordance with the second radio access technology, wherein the ACK is configured to indicate to the second base station a correct reception by the user equipment of both the first data transmission and the second data transmission, and wherein the NACK is configured to indicate to the second base station an incorrect reception by the user equipment of either the first data transmission or the second data transmission, or both.

30. A user equipment for wireless communication in a multiple radio access technology environment, comprising:

a memory comprising executable instructions; and
a processor configured to execute the executable instructions and cause the user equipment to:
receive, at the user equipment from a first base station, a first data transmission on a first physical downlink shared channel in accordance with a first radio access technology; and transmit, from the user equipment to a second base station, at least one of:
- an acknowledgment (ACK) on a physical uplink control channel in accordance with a second radio access technology after determining, by the user equipment, that the first data transmission has been received correctly; or
- a negative acknowledgment (NACK) on the physical uplink control channel in accordance with the second radio access technology, after determining, by the user equipment, that the first data transmission has not been received correctly; and receive, at the user equipment from the second base station, a second data transmission on a second physical downlink shared channel in accordance with the second radio access technology, wherein the ACK is configured to indicate to the second base station a correct reception by the user equipment of both the first data transmission and the second data transmission, and wherein the NACK is configured to indicate to the second base station an incorrect reception by the user equipment of either the first data transmission or the second data transmission or both.

* * * * *